United States Patent [19]

Hirai et al.

[11] Patent Number: 5,032,367
[45] Date of Patent: Jul. 16, 1991

[54] METHOD FOR PRODUCING POWDERED IRON OXIDE

[75] Inventors: Naoe Hirai, Yokohama; Tohoru Murase; Katsunobu Okutani, both of Ichikawa; Teruo Mori, Sakura, all of Japan

[73] Assignees: Chemirite, Ltd.; TDK Corporation, Tokyo, Japan

[21] Appl. No.: 285,451

[22] Filed: Dec. 16, 1988

[30] Foreign Application Priority Data

Oct. 17, 1988 [JP] Japan .................................. 63-259448

[51] Int. Cl.$^5$ .......................... C01G 49/02; C22B 1/00
[52] U.S. Cl. ..................................... 423/142; 423/140; 423/632; 423/633; 423/DIG. 1
[58] Field of Search .................. 423/632, 633, DIG. 1, 423/140, 142; 252/62, 56

[56] References Cited

U.S. PATENT DOCUMENTS

| | | | |
|---|---|---|---|
| 1,773,235 | 8/1930 | Mitchell | 75/725 |
| 2,423,385 | 7/1947 | Hixon et al. | 423/140 |
| 3,781,405 | 12/1973 | Allan et al. | 423/142 |
| 3,903,236 | 9/1975 | McCutcheon et al. | 423/35 |
| 4,026,773 | 5/1977 | Van Peteghem | 204/108 |

FOREIGN PATENT DOCUMENTS

| | | |
|---|---|---|
| 49-32711 | 9/1974 | Japan . |
| 51-158158 | 7/1978 | Japan . |
| 0073439 | 4/1984 | Japan .................. 423/140 |
| 62-235221 | 10/1987 | Japan . |
| 63-117915 | 5/1988 | Japan . |

OTHER PUBLICATIONS

Kawasaki Seitetsu Company Catalog Document.

*Primary Examiner*—Gary P. Straub
*Assistant Examiner*—Steven Bos
*Attorney, Agent, or Firm*—Finnegan, Henderson, Farabow, Garrett & Dunner

[57] ABSTRACT

A method for producing a powdered iron oxide comprises the steps of adjusting the pH of a crude iron chloride solution to 2.5–4.5; reducing the P content of the solution by mechanical stirring or air bubbling and filtering; and oxidizing the solution into a powdered iron oxide having a maximum P content of 0.005 wt. %. The P content of the solution may also be reduced by ultrafilter treatment. The soft ferrite made by using the powdered iron oxide by this process shows excellent magnetic properties.

4 Claims, 5 Drawing Sheets

METHOD FOR PRODUCING POWDERED IRON OXIDE

BACKGROUND OF THE INVENTION

1. Field of the Invention

The present invention relates to a method for producing powdered iron oxide used for manufacturing high-quality soft ferrite.

2. Description of the Related Art

Powdered iron oxides are widely produced by roasting and oxidizing a crude iron chloride solution. A hydrochloric solution after use for pickling of iron and steel, a solution obtained by dissolving iron and steel and or iron oxide in hydrochloric acid, the heated and concentrated solutions thereof or the solutions thereof whose insolubles are filtrated, are used for such a crude iron chloride solution.

Powdered iron oxide is used as a raw material for soft ferrite. FIG. 1 shows an example of a typical process for making powdered iron oxide. In FIG. 1, a waste hydrochloric pickling solution 6 is stored in a reservoir 1. The hydrochloric pickling solution 6 is contacted with hot gas 3 in a contact tower 2. Hot gas 3 containing hydrogen chloride is generated in a roasting furnace 5. By this contact the waste hydrochloric pickling solution is heated and concentrated in the contact tower 2. The heated and concentrated solution is then sprayed in the roasting furnace 5, and a sprayed mist of the solution is roasted and oxidized, thereby producing a powdered iron oxide 4 and hot gas 3. An electrostatic dust collector 7 collects the powdered iron oxide 4. The hydrochloric acid is recovered from hot gas 3 in a recovering tower 8. The numeral 9 represents spray water and reference number 10 is hot air. Iron and steel or iron oxide contains Si, Al, Cr, Cu, P and etc., and industrial water contains Ca. These elements are contained in the crude iron chloride solutions. Powdered iron oxide produced by roasting the crude iron chloride solution also contains those elements as impurities. This process of producing powdered iron oxide is very simple and the cost of the powdered iron oxide produced thereby is low. Accordingly, the powdered iron oxides made by this process are used widely as raw materials for soft ferrite of ordinary grades. However for high-quality soft ferrite the powdered iron oxides made by this process are not used because of the impurities contained therein.

Powdered iron oxide having a decreased content of $SiO_2$ and CaO also may be produced by this process if certain additional treatment to the crude iron chloride solution is performed. However, the powdered iron oxide of decreased $SiO_2$ and CaO content is still unsatisfactory for the high-quality soft ferrite, and this powdered iron oxide is not used for high-quality soft ferrite. For high-quality soft ferrite a high-purity powdered iron oxide of very low impurity content exclusively is used.

A high-quality powdered iron oxide is usually produced by a crystal refining method. In the crystal refining method crystals of iron sulfate or iron chloride are crystallized from an aqueous solution thereof, and the high-purity powdered iron oxides are produced by oxidizing these crystals. In this method, however, the impurities are not reduced sufficiently by a single occurrence of crystallization because some of the impurities remain included in the crystals. The thus obtained crystals are, therefore, dissolved again in water etc., and crystallized again. These treatments are repeated several times, thereby reducing the impurity content of the crystals. According to the crystal refining method a high-purity powdered iron oxide is obtained, in which the content of all impurities is very low. However, the crystal refining process is complicated and the production cost or the powdered high-quality iron oxide produced thereby is very high. Among the impurities in powdered iron oxide, some impurities may impair the properties of a soft ferrite, and others do not. However, general knowledge regarding the type of impurities which impair the ferrite properties has been insufficient, and it has been difficult to improve the powdered iron oxide of ordinary grades to a level sufficient for the high-quality soft ferrite.

Accordingly, it is an object of the invention to selectively remove harmful impurities from an iron oxide.

Another object of the invention is to simplify the process for producing iron oxide for high quality soft ferrite.

It is a further object of the invention to reduce the cost of producing iron oxide for high quality soft ferrite.

SUMMARY OF THE INVENTION

To achieve the above-described objects and advantages, the method for producing a powdered iron oxide of the present invention comprises the steps of adjusting the pH of a crude iron chloride solution to 2.5–4.5, agitating the solution until insoluble $Fe^{3+}$ compounds are present in a range of 0.01–0.1 wt. % and the pH is at least 1.5, separating the insolubles by filtration, and roasting the filtrate to oxidize it into a powdered iron oxide having a maximum P content of 0.005 wt. %. The agitation step may be carried out by mechanical stirring or by bubbling air through the solution. An ultrafiltration technique may also be utilized.

The powdered iron oxide produced by the above method may be used for making high quality soft ferrite.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENT

Reference will now be made in detail to the present preferred embodiment of the invention, an example of which is illustrated in the accompanying drawings.

The present inventors used powdered iron oxides having different P contents, and mixed a high-purity manganese oxide and a high-purity zinc oxide therewith in the usual manner so that the molecular ratio of $Fe_2O_3$: MnO: ZnO is 53:24.5:22.5 was obtained. The mixture was sintered at a temperature of 1350° C. and test pieces of ring shape were obtained. The pieces had an outer diameter of 25 mm, an inner diameter of 15 mm and a thickness of 5 mm. The AC initial magnetic permeability $\mu iac$ and the relative loss factor $tan\delta/\mu iac$ at 1 kHz and 25° C. were measured in accordance with the method prescribed in JIS C 2561. In Table 1 the impurities of the powdered iron oxides used for each test piece, the composition of the mixed powders and the magnetic properties of each test piece are shown. In Table 1, Nos. 1–8 were produced by using the powdered iron oxides according to the present invention, Nos. 9–11 were produced by using the powdered iron oxides obtained by oxidizing and roasting the crude iron chloride solution by a conventional process without a dephosphorizing treatment of the present invention, and Nos. 14 and 15 were produced by using the high purity powdered iron oxides obtained by the crystal refining method.

Figure 2:
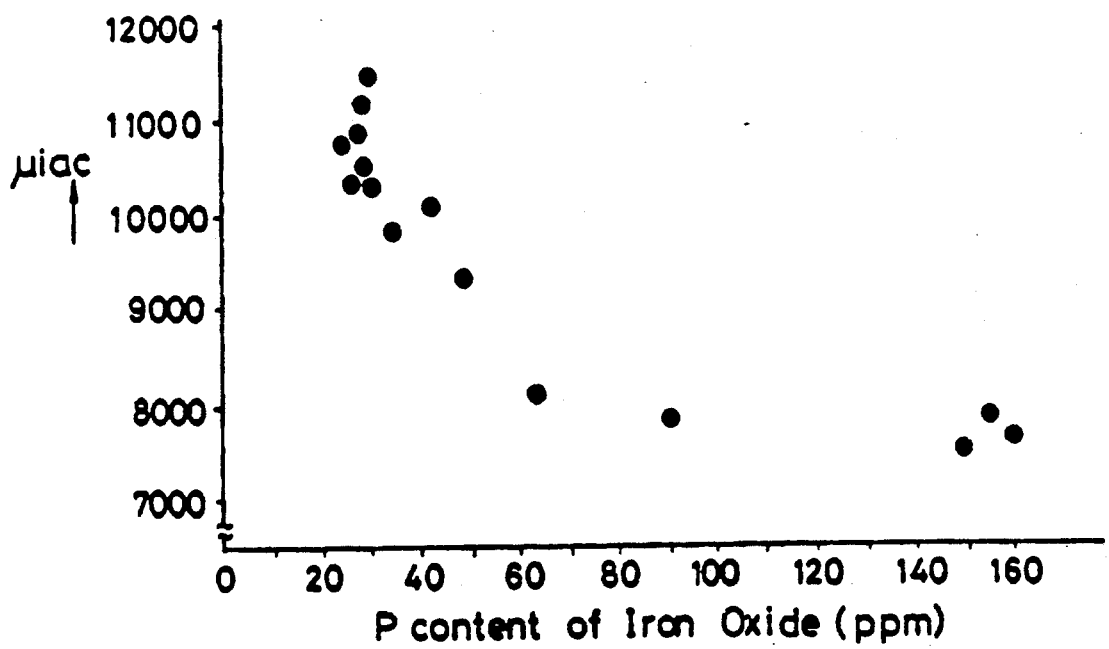
FIG. 2 is a plot showing the relation between P content of the powdered iron oxide and $\mu$iac.
Figure 3:
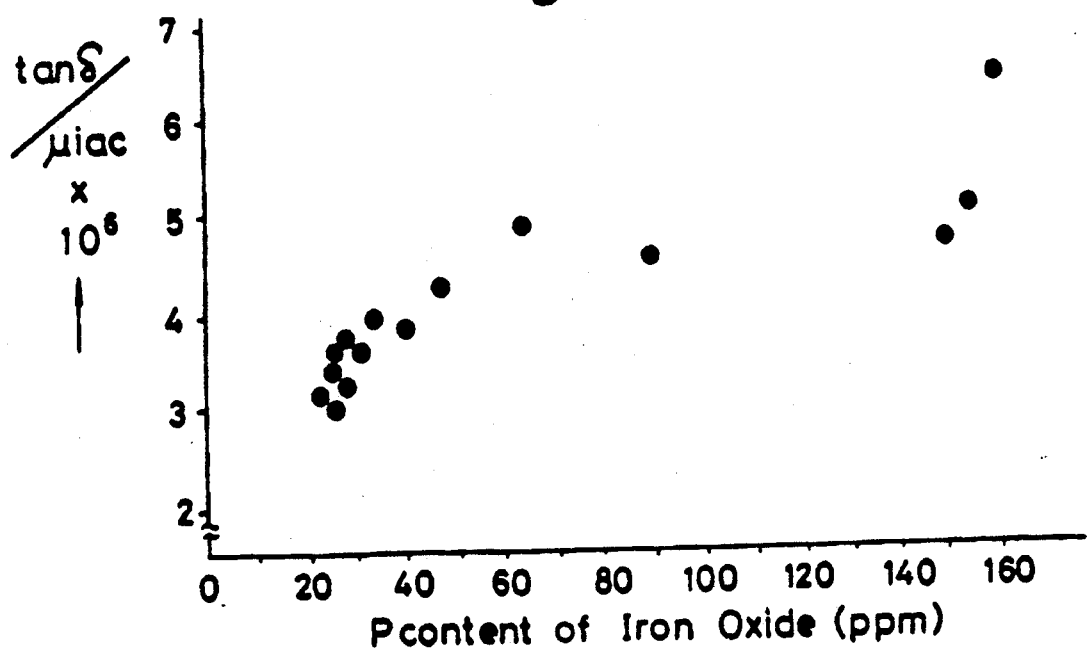
FIG. 3 is a plot showing the relation between P content of the powdered iron oxide and $\tan\delta/\mu$iac.

FIG. 2 shows the relation between the P content of the powdered iron oxides and the $\mu iac$ of Table 1. FIG. 3 shows the relation between the P content of the powdered iron oxides and the $tan\delta/\mu iac$ of Table 1. As shown in Table 1, the P content of the mixed powder is decreased by using powdered iron oxide of low P content, and as shown in FIG. 2 and FIG. 3, the magnetic properties of a soft ferrite are remarkably improved by using powdered iron oxides of low P content.

Test piece Nos. 1–8 using the powdered iron oxides of the present invention with a P content of not more than 0.005 wt. % had a lower P content in the mixed powder and exhibited superior magnetic properties as compared with Nos. 9–13. Nos. 1–5 are examples using the powdered iron oxides of the present invention, whose P-contents are not more than 0.003 wt. %. These exhibited the same level of magnetic properties as samples No. 14 and No. 15.

From the findings mentioned above, a powdered iron oxide containing not more than 0.005 wt. % of P is required in order to produce soft ferrite of excellent magnetic properties.

According to the present invention, the pH of the crude iron chloride solution is adjusted to 2.5–4.5 and this solution is agitated or stirred mechanically until the solution is changed to a solution whose pH is not less than 1.5 and which contains insoluble $Fe^{3+}$ compounds of 0.01–0.1 wt. % being calculated in terms of Fe. Then the solution is filtered to separate the insolubles from the solution.

TABLE 1

| No. | Impurities in Powdered Iron Oxide | | | Contents of the Mixed Powders | | | | | Magnetic Properties | | Remarks |
|---|---|---|---|---|---|---|---|---|---|---|---|
| | Mn (%) | P (ppm) | $SiO_2$ (ppm) | *$Fe_2O_3$ (%) | *MnO (%) | *ZnO (%) | $SiO_2$ (ppm) | P (ppm) | $\mu iac$ | $tan\delta/\mu iac$ | |
| 1 | 0.23 | 27 | 95 | 70.28 | 14.48 | 15.24 | 108 | 27 | 10900 | $3.5 \times 10^{-6}$ | Iron Oxide According to |
| 2 | 0.16 | 28 | 50 | 70.39 | 14.40 | 15.21 | 112 | 26 | 11200 | $3.6 \times 10^{-6}$ | the Present Invention |
| 3 | 0.21 | 28 | 55 | 70.37 | 14.44 | 15.19 | 124 | 27 | 10500 | $3.2 \times 10^{-6}$ | |
| 4 | 0.28 | 29 | 75 | 70.31 | 14.47 | 15.22 | 118 | 28 | 11500 | $3.6 \times 10^{-6}$ | |
| 5 | 0.18 | 26 | 80 | 70.34 | 14.39 | 15.27 | 125 | 24 | 10400 | $3.0 \times 10^{-6}$ | |
| 6 | 0.22 | 34 | 72 | 70.34 | 14.41 | 15.25 | 118 | 32 | 9800 | $3.9 \times 10^{-6}$ | |
| 7 | 0.28 | 41 | 83 | 70.40 | 14.42 | 15.18 | 115 | 37 | 10100 | $3.8 \times 10^{-6}$ | |
| 8 | 0.23 | 48 | 68 | 70.33 | 14.44 | 15.23 | 122 | 44 | 9300 | $4.2 \times 10^{-6}$ | |
| 9 | 0.26 | 150 | 105 | 70.38 | 14.42 | 15.20 | 129 | 104 | 7500 | $4.6 \times 10^{-6}$ | Iron Oxides of Ordinary Grade |
| 10 | 0.23 | 90 | 85 | 70.43 | 14.40 | 15.17 | 121 | 62 | 7900 | $4.5 \times 10^{-6}$ | |
| 11 | 0.18 | 64 | 95 | 70.35 | 14.46 | 15.19 | 116 | 52 | 8100 | $4.9 \times 10^{-6}$ | |
| 12 | 0.22 | 160 | 80 | 70.33 | 14.45 | 15.22 | 110 | 117 | 7700 | $6.4 \times 10^{-6}$ | |
| 13 | 0.23 | 155 | 60 | 70.42 | 14.38 | 15.20 | 114 | 110 | 7900 | $5.0 \times 10^{-6}$ | |
| 14 | 0.006 | 23 | 40 | 70.35 | 14.42 | 15.23 | 120 | 22 | 10800 | $3.1 \times 10^{-6}$ | High-purity Iron Oxide |
| 15 | 0.054 | 27 | 85 | 70.38 | 14.45 | 15.17 | 125 | 26 | 10400 | $3.4 \times 10^{-6}$ | by Crystal Refining Method |

*Weight percentage when $Fe_2O_3$, MnO and ZnO amount to 100%.

By this filtratiOn, P is removed with the insolubles, and the filtrate is a purified solution of a low P-content. Subsequently, by oxidizing roasting this purified solution a powdered iron oxide whose P-content is not more than 0.005 wt. % is obtained.

In the following, a crude iron chloride solution is described. A hydrochloric solution is widely used for pickling and descaling of iron and steel. The waste pickling solution after being used for pickling and descaling, for example, contains about 11 wt. % of iron ions and about 0.0025 wt. % of P, and can be used as a crude iron chloride solution. As described later, in this invention the P in the crude iron chloride solution is removed as an insoluble compound where P has an oxidation number of 5+. P contained in an iron oxide formed on the surface of steel is in an oxidized state and is dissolved in the waste pickling solution. Accordingly P in the waste pickling solution is $P^{5+}$, and the waste pickling solution can be used without the pretreatment described later.

A crude iron chloride solution can be obtained also by dissolving steel scrap in hydrochloric acid. However, since the P in steel scrap is insufficiently oxidized, the P in the crude iron chloride solution is also insufficiently oxidized. Therefore, when using an iron chloride solution obtained by dissolving steel scrap in hydrochloric acid, such pretreatment of oxidizing P, for example, as heating the iron chloride solution by addition of 20 liters of $HNO_3$ to every 1 $m^3$ thereof, are preferably performed.

In the present invention the pH of the crude iron chloride solution is adjusted to 2.5–4.5. This adjustment of pH may be performed by using, for example, an alkali compound such as aqueous ammonia. It also can be performed by dissolving steel scrap or mill scale into the iron chloride solution, where $H^+$ ions of the crude iron chloride solution are exhausted and the pH is adjusted thereby. In the present invention, as described later, the pH adjusted solution is stirred mechanically in the air, whereby the pH of the solution drops. When the pH drops to less than 1.5 in the course of mechanical stirring, it becomes difficult to reduce the P sufficiently. When the pH is adjusted to not less than 2.5 before mechanical stirring, a pH value of not less than 1.5 is easily ensured during the mechanical stirring. The pH may be adjusted to more than 4.5, but when adjusted to more than 4.5, a large amount of insolubles are formed in the solution, which lowers the efficiency of the filtration described later.

In the present invention the pH adjusted solution is stirred mechanically, and subsequently the insolubles therein are separated by filtration. Thus, the filtrate is obtained as a purified solution. The mechanical stirring is a usual stirring using stirring arms or propellers or a circulation pump, and the filtration is an ordinary filtration by a filter press using normal filter paper or filter cloth.

Figure 4:
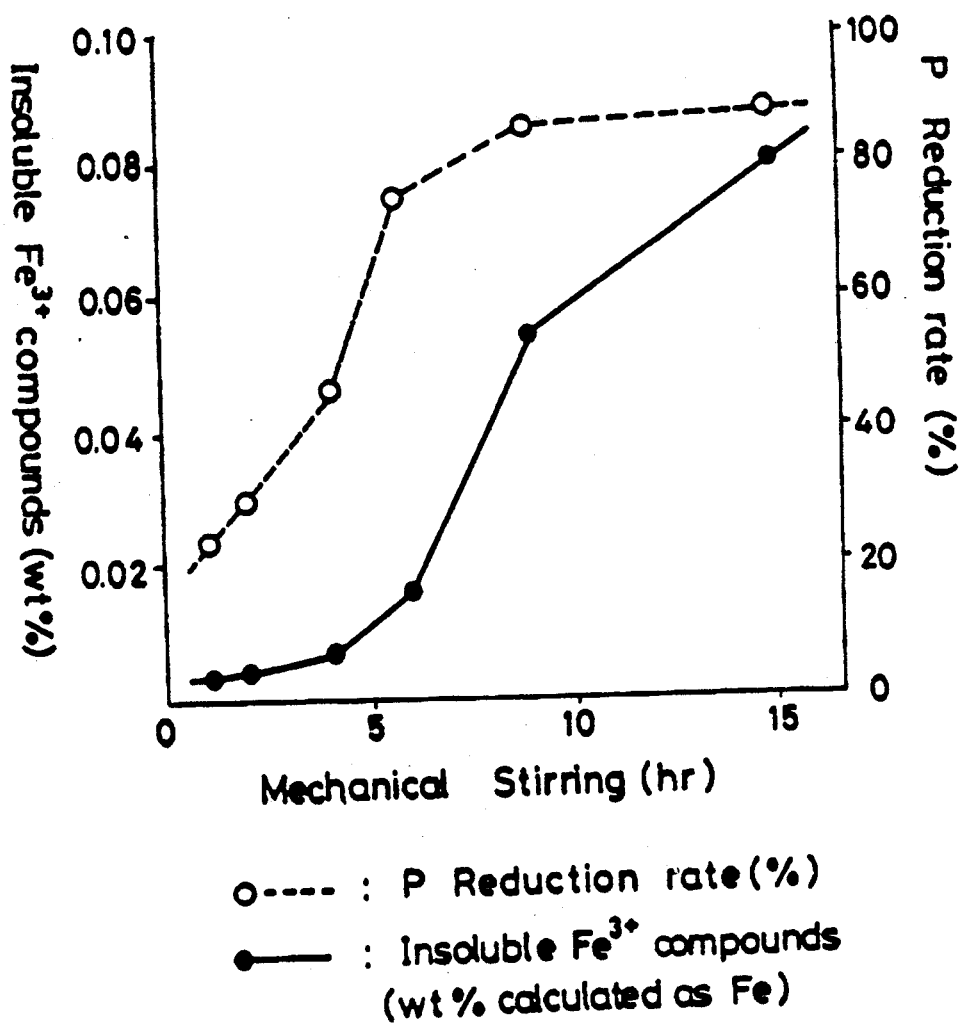
FIG. 4 shows the formation of insoluble $Fe^{3+}$ compounds and the reduction rate of P in the iron chloride solution from mechanical stirring.

FIG. 4 shows the formation of the insoluble $Fe^{3+}$ compound in the solution and the P reduction rate of the solution. The P reduction rate is expressed in this specification as $\{(P\% \text{ before pH adjusting} - P\% \text{ of the filtrate})/(P\% \text{ before pH adjusting})\} \times 100$.

As FIG. 4 shows, when the mechanical stirring is performed for example for about 5 hours, less than 0.01 wt. % of insoluble $Fe^{3+}$ compound being calculated as Fe is formed in the solution. In this stage, the P reduction rate of the solution is less than 60%. However, when the amount of insoluble $Fe^{3+}$ compound exceeds 0.01 wt. %, the P reduction rate of the solution is high and stable. Mechanical stirring may continue further and form insoluble $Fe^{3+}$ compounds of more than 0.1 wt. % calculated as Fe. However, too much insoluble $Fe^{3+}$ compound formed in the solution may lower the efficiency of filtration.

As described above, the insoluble $Fe^{3+}$ compound is formed in an amount of 0.01-0.10 wt. % calculated in terms of Fe according to the present invention. In the present invention the pH of the solution is maintained at not less than 1.5 during the mechanical stirring and the filtration. When the insoluble $Fe^{3+}$ compounds are formed by mechanical stirring, the pH of the solution drops. As described later, when the pH of the solution drops to less than 1.5 insoluble compounds of P formed in the solution dissolve into the solution, and pass through the meshes of filter paper or filter cloth during filtration, so that the amount of P in the purified solution increases.

Figure 1:
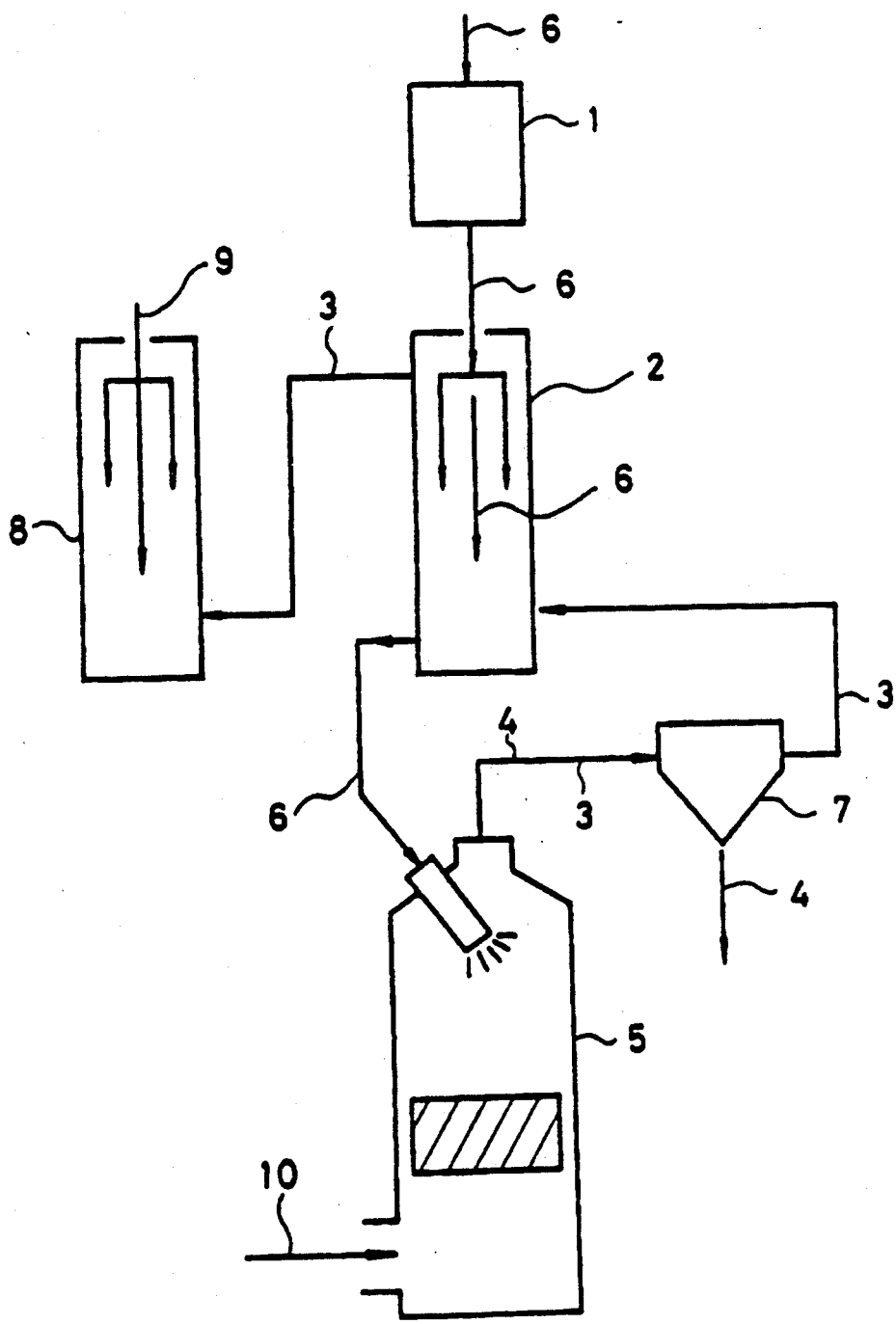
FIG. 1 shows an example of the oxidizing roasting process for an iron chloride solution.

By performing the above mentioned treatments on a crude iron chloride solution, a purified solution containing for example 11 wt. % of Fe and not more than 0.0008 wt. % of P is obtained. By oxidizing roasting this purified solution by means of the usual method, for example using a fluidized layer at 700° C. in the oxidation roasting furnace 5 in FIG. 1, a powdered iron oxide with a P content of not more than 0.005 wt. % is produced.

In another embodiment of this invention the pH of the crude iron chloride solution is adjusted to 2.5-4.5, and then is subjected to air bubbling.

Figure 5:
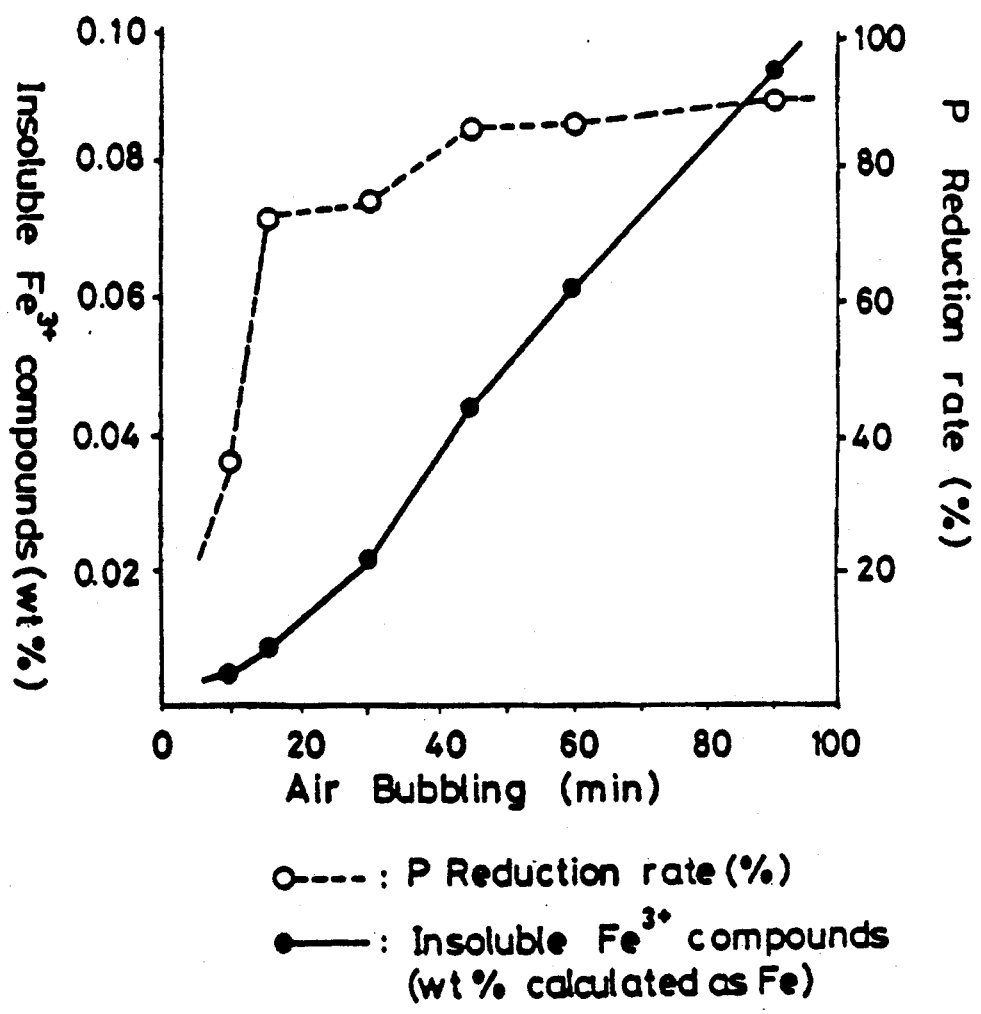
FIG. 5 shows the formation of insoluble $Fe^{3+}$ compounds and the reduction rate of iron chloride solution from air bubbling.

FIG. 5 shows the formation of the insoluble $Fe^{3+}$ compounds in the solution and the P reduction rate of the solution from air bubbling. As FIG. 5 shows, the insoluble $Fe^{3+}$ compound can be formed in a short time by air bubbling. That is, in the case of FIG. 5, 0.01 wt. % of the insoluble $Fe^{3+}$ compounds are formed by air bubbling for about 20 minutes, and by performing the air bubbling to this extent, more than 60% of the P reduction rate of the solution is realized.

As in the case of the first embodiment, if the air bubbling is performed for a longer time, more insolubles of $Fe^{3+}$ compounds are formed. However, if the insoluble $Fe^{3+}$ compounds reach 0.10 wt. % calculated as Fe, the high insolubles lower the efficiency of filtration. Therefore, the air bubbling is performed for a period of time until the insoluble $Fe^{3+}$ compounds are formed in an amount of 0.01-0.10 wt. % calculated in terms of Fe. As in the first embodiment, when the insoluble $Fe^{3+}$ compounds are formed by air bubbling, the pH of the solution drops. When the pH of the solution drops to less than 1.5, insoluble P compounds are dissolved again in the solution and the amount of P in the purified solution increases.

By performing the above mentioned treatments, a purified solution containing for example 11 wt. % of iron and not more than 0.0008 wt. % of P can be obtained. By oxidizing roasting this purified solution as in the first embodiment, a powdered iron oxide with a P-content of not more than 0.005 wt. % is produced.

Figure 6:
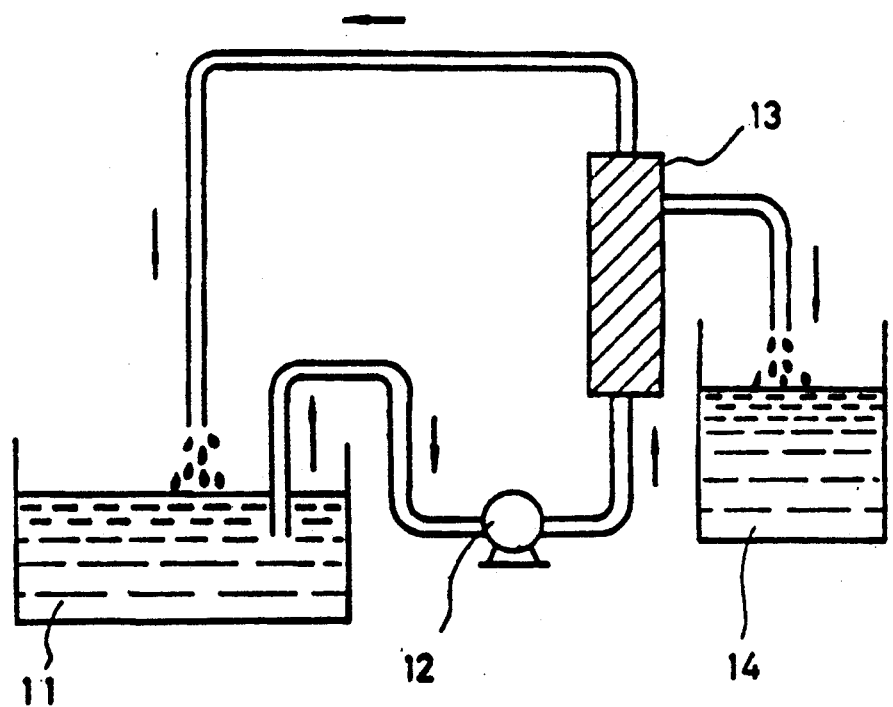
FIG. 6 shows a process flow for the ultrafiltration treatment.

A third embodiment of the present invention now will be explained. In this method the pH of the crude iron chloride solution is adjusted to 2.5-4.5, and the solution is directly treated by ultrafiltration equipment, where the insolubles are removed by an ultrafilter, whereby a purified solution is obtained. FIG. 6 shows a process flow to remove the insolubles. Numeral 11 is a pH adjusted crude iron chloride solution, 12 is a circulation pump, 13 is an ultrafilter, and 14 is a purified solution.

As mentioned above, even if the pH of the crude iron chloride solution is adjusted to 2.5-4.5, the P content of the filtrate by usual filtration cannot be reduced sufficiently without mechanical stirring for longer than 5 hours, for example, in case of FIG. 4, or without an air bubbling for about 20 minutes, for example, in case of FIG. 5. However, by treating the solution with an ultrafilter having a pore size of 20Å, the P content in the purified solution can be reduced sufficiently even without mechanical stirring or air bubbling, and a purified solution containing 11 wt. % of iron and not more than 0.0008 wt. % of P is obtained. By oxidizing roasting this purified solution, a powdered iron oxide with a P-content of not more than 0.005 wt. % is produced.

The reasons why a powdered iron oxide whose P content is not more than 0.005 wt. % can be obtained according to the present invention now will be explained.

For example, steel scrap (carbon steel) usually contains 0.03% of P. A corresponding amount of P is also contained in the oxidized scale of the steel. When the steel scrap or the oxidized scale thereof is dissolved in hydrochloric acid, the P is also dissolved in the solution. As explained earlier, P in the waste pickling solution has an oxidation number of 5+, and $p^{5+}$ in the crude iron chloride solution behaves as in the following formulas (1)-(3):

$$H_3PO_4 = H^+ + H_2PO_4^- \tag{1}$$

$$H_2PO_4^- = H^+ + HPO_4^{2-} \tag{2}$$

$$HPO_4^{2-} = H^+ + PO_4^{3-} \tag{3}$$

When the crude iron chloride solution is acidic and has a low pH, the dissociation of formulas (2) and (3) does not take place, and $H_3PO_4$ and $H_2PO_4$ and $H_2PO_4^-$ are only formed in the solution. Then the P cannot be removed from the solution because $H_3PO_4$ and the metallic salts of $H_2PO_4^-$ are water soluble. When the pH of this solution is raised to 2.5 by adding another steel scrap thereto, dissociations of formulas (2)

and (3) take place whereby $HPO_4^{2-}$ and $PO_4^{3-}$ ion are produced. $HPO_4^{2-}$ and $PO_4^{3-}$ ions may combine with metallic ion in the solution and form metallic salts of $HPO_4^{2-}$ and $PO_4^{3-}$, where metallic salts of $HPO_4^{2-}$ and $PO_4^{3-}$ are insoluble in the crude iron chloride solution, and they can be separated as insolubles from the crude iron chloride solution by means of the methods described above.

When the pH of the crude iron chloride solution is adjusted to 2.5–4.5, insolubles of the P compounds are formed. Even if the insolubles of the P compounds are formed in the solution by adjusting the pH to 2.5–4.5, the insoluble P compounds have a very fine size, and although they can be removed with an ultrafilter having a pore size of 20Å, they are difficult to separate from the solution by using the usual filter paper or filter cloth and they pass through the mesh of the filter paper or filter cloth and enter into the purified solution. When the crude iron chloride solution is subjected sufficiently to the mechanical stirring or to the air bubbling, and when more than 0.01 wt. % of insoluble $Fe^{3+}$ compounds are formed, the insoluble P compounds can be filtrated with the usual filter paper or filter cloth, probably because the insoluble fine P compounds are changed to the form of insolubles not passing through the meshes of the filter paper or filter cloth.

In embodiments 1 and 2, the time to start the filtration is judged by the amount of insoluble $Fe^{3+}$ compounds formed in the crude iron chloride solution. This timing of filtration can be easily judged in operation by observing the color of the solution, because the color of the crude iron chloride solution clearly turns to brown when the amount of 0.01–0.1 wt. % of insoluble $Fe^{3+}$ compounds are formed in the solution.

The present invention provides methods for producing a powdered iron oxide by oxidizing roasting of an iron chloride solution after removing P intensively from the solution, wherein the method for removing P from the solution is very simple, and a powdered iron oxide can be produced simply and cheaply as compared with the conventional crystal refining method.

Although the powdered iron oxide produced according to the present invention contains such impurities as Mn etc., which do not impair the magnetic properties of ferrite, the soft ferrite manufactured by using this powdered iron oxide exhibits the same magnetic properties as the soft ferrite manufactured by using the high-purity powdered iron oxides, so that the powdered iron oxide according to the present invention can be used for manufacturing of a high-quality soft ferrite.

What is claimed is:

1. A method for producing a powdered iron oxide from a crude iron chloride solution containing phosphorus, comprising the steps of:
   adjusting the pH of the crude iron chloride solution to 2.5–4.5;
   agitating the solution until insoluble $Fe^{3+}$ compounds are present in a range of 0.01–0.1 wt. % Fe and pH is at least 1.5;
   separating the insolubles from the solution by filtration; and
   roasting the filtrate to oxidize the filtrate into a powdered iron oxide having a phosphorus content of less than 0.005 wt. %.

2. A method of claim 1 wherein the step of agitating includes the step of mechanically stirring the solution.

3. The method of claim 1 wherein the step of agitating includes the step of bubbling air through the solution.

4. A method for producing a powdered iron oxide from a crude iron chloride solution containing phosphorus, comprising the steps of:
   adjusting the pH of the crude iron chloride solution to 2.5–4.5;
   separating insolubles from the solution by ultrafiltration treatment; and
   roasting the purified solution to oxidize the purified solution into the powdered iron oxide having a phosphorus content of less than 0.005 wt. %.

* * * * *